United States Patent [19]

Cooper et al.

[11] 4,165,908
[45] Aug. 28, 1979

[54] INTERLOCKING DEVICE FOR PORTABLE FOOD SERVICE CABINETS

[75] Inventors: Frank W. Cooper, Fort Lauderdale; Arthur B. Dixon, Jr., Coral Gables, both of Fla.

[73] Assignee: Shelley Manufacturing Company, a division of Alco Food Service Equipment Company, Miami, Fla.

[21] Appl. No.: 933,455

[22] Filed: Aug. 14, 1978

[51] Int. Cl.$^2$ .................... F16B 12/38; A47B 87/00
[52] U.S. Cl. ..................... 312/111; 108/64; 403/317; 403/388
[58] Field of Search ............... 312/111, 140.3, 140.4; 108/64; 220/23.4; 403/263, 317, 388; 248/289 R

[56] References Cited

U.S. PATENT DOCUMENTS

| 2,296,782 | 9/1942 | Fischer et al. | 108/64 |
| 2,848,289 | 8/1958 | Page | 108/64 |
| 3,261,307 | 7/1966 | Salkoff | 108/64 |

*Primary Examiner*—Mervin Stein
*Assistant Examiner*—A. Grosz
*Attorney, Agent, or Firm*—Ernest H. Schmidt

[57] ABSTRACT

The device comprises a pair of locating pins extending outwardly of an edge surface portion of one of the cabinets and adapted to be received in complementary through openings in the corresponding edge of the adjacent cabinet to be connected, the outer ends of the locating pins being conically rounded to provide for horizontal and vertical alignment by cam action. An elongated, lever controlled interlock member serves to interclampingly engage turned down skirt portions of the thus aligned cabinet edges to retain the cabinets in interlocked relation.

8 Claims, 5 Drawing Figures

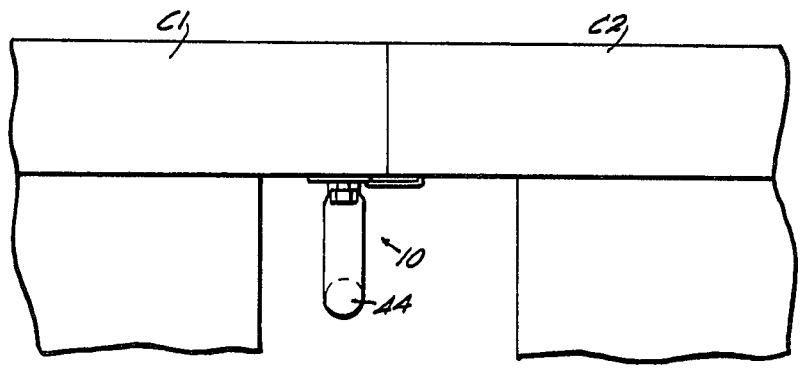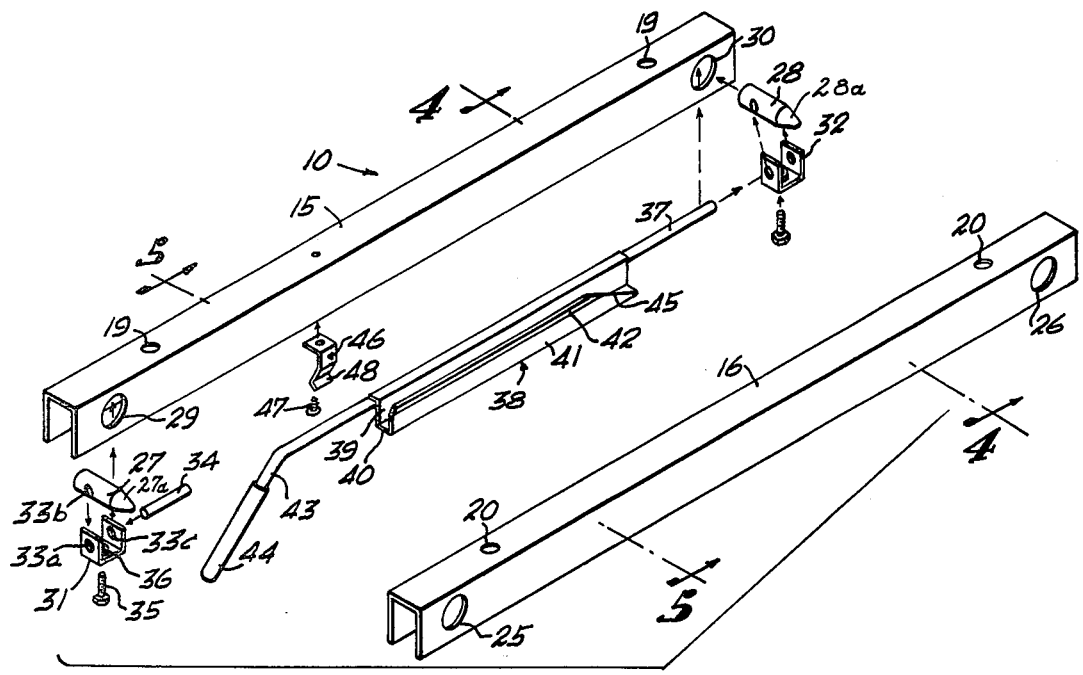

INTERLOCKING DEVICE FOR PORTABLE FOOD SERVICE CABINETS

This invention relates to food service cabinets of the type used in restaurants and cafeterias and is directed particularly to a novel and improved mechanism for releasable interconnecting or coupling a plurality of such cabinets in vertical and horizontal alignment for use as a cafeteria style serving line.

In many public institutions, efficient use of building facilities dictates that the dining facilities be combined with one of the larger general use rooms such as an auditorium. Such dual use of room facilities has become so general, particularly in schools, that the word "cafetorium" has been coined to describe the usage. To accommodate for such use, rollably portable food service cabinets having slide-tray facilities are arranged to form a serving line along the front of which the dining patrons can pass for food service as in an ordinary cafeteria. In such arrangements, various interlocking mechanisms have heretofore been devised for securing food service cabinets thus aligned in more or less rigid interconnection. The interconnection devices heretofore known, however, have been deficient in one or more respects, principally in that both horizontal and vertical alignment of adjacent cabinets was difficult to achieve, particularly along cabinet lines supported on irregular flooring. Such misalignment resulted in irregularities in level of the slide-tray sections at the front of the food service cabinets, thereby interfering with the free sliding motion of trays being pushed along the serving line.

It is, accordingly, the principal object of this invention to provide a novel and improved mechanism for releasably interconnecting food service cabinets and the like that, in addition to establishing firm interconnection between adjacent cabinets, at the same time aligns the cabinets both horizontally and vertically.

A more particular object of the invention is to provide locating and interconnecting mechanism of the character described comprising a pair of locating pins extending outwardly of a down turned edge portion of the top surface edge of one of the cabinets for reception in complementary through openings in the corresponding turned down top surface edge of the adjacent cabinet to be connected, the outer ends of the locating pins being conically rounded to provide for horizontal and vertical alignment by cam action. The cabinets are releasably retained in such aligned, edge to edge relation by means of an elongated clamp member of generally U-shaped cross-sectional configuration joined along a vertically swingable lever manually controlled to straddle and interclamp the turned down cabinet top edges.

Another object of the invention is to provide a locating and interconnecting mechanism of the above nature the cooperative connector members of which are readily adapted for use with a wide variety of portable food service cabinets for effecting their straight and level interconnection whenever required.

Yet another object of the invention is to provide a locating and interconnecting mechanism for portable food service cabinets that will be simple in construction, easy to install, inconspicuous in appearance and durable in use.

Other objects, features and advantages of the invention will be apparent from the following description when read with reference to the accompanying drawings. In the drawings, wherein like reference numerals denote corresponding parts throughout the several views:

FIG. 1 is a fragmentary view, in elevation, of a pair of side-by-side food service cabinets, as seen from behind the cabinets, equipped with interlocking mechanism embodying the invention;

FIG. 3 is an exploded view of the interlocking mechanism components, shown separately;

FIG. 4 is a partial vertical cross-sectional view illustrating details of the interlocking mechanism in supporting a pair of cabinets in side-to-side interlocking relation, the cross-section being taken at the approximate position indicated at 4—4 of FIG. 2; and FIG. 5 is a cross-sectional view similar to that of FIG. 4 but taken at the approximate position indicated at 5—5 of FIG. 2.

Figure 2:
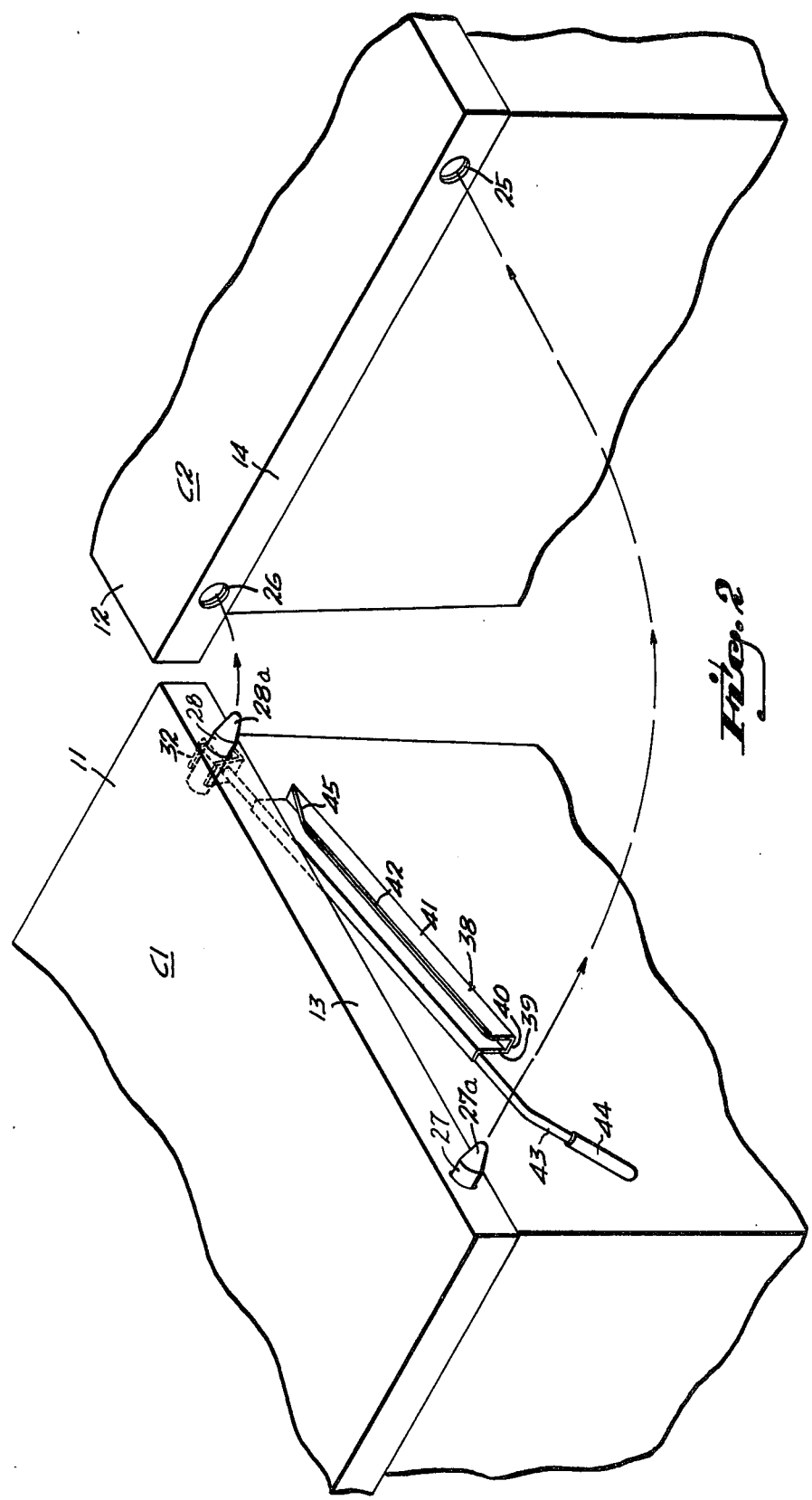
FIG. 2 is a perspective view, as seen from above, of the food service cabinets, rotated approximately 90 degrees out of interlocking position and illustrating details thereof.

Referring now in detail to the drawings, reference characters C1 and C2 designate a pair of side by side food service cabinets, as seen from behind, equipped with interlocking mechanism 10 embodying the invention, and shown in interlocked relation in FIGS. 1, 4, and 5. As best illustrated in FIGS. 4 and 5, the food service cabinets C1 and C2 are formed with flat, sheet metal cabinet tops 11, 12 having down-turned side flanges or skirt portions 13, 14, respectively, which are required to be clamped in face-to-face registering interrelation, as illustrated in FIG. 1, by means of the interlocking mechanism comprising the present invention. To this end, the interlocking mechanism 10 comprises inverted U-channel members 15, 16 secured along the insides of the cabinet skirt portions 13, 14, respectively, as by pairs of weld stud and nut assemblies 17, 18 (only one of each pair being illustrated in FIGS. 4 and 5), said weld studs extending through openings 19, 19, and 20, 20 illustrated in FIG. 3. As illustrated in FIGS. 4 and 5, these attachment weld studs are welded to the underside of the stainless steel top and sandwich the mounting flanges 23, 24 between the metal table tops 11, 12 and the inverted U-channel members 15 and 16, respectively.

As illustrated in FIGS. 2, 3, and 4, turned down skirt portion 14 of food service cabinet C2 is formed with a pair of spaced openings 25, 26 which extend transversely through the opposed vertical legs of inverted U-channel member 16. The through openings 25, 26 serve as guide and locating means for a pair of locating pins 27, 28 extending outwardly of the turned down skirt portion 13 of associated food service cabinet C1.

The locating pins 27, 28 are received in through transverse bores 29, 30 in the vertical legs of inverted U-channel member 15, and are retained in place by respective U-brackets 31, 32. The upturned legs of the U-bracket 31 and the locating pin 27 are transversely drilled to provide aligned through opening 33a, 33b, 33c, through which is assembled a connecting pin 34. A machine screw 35 threadingly received in nut 36 secured to the inner web surface of U-bracket 31 is utilized to jam against the underside of locating pin 27 to prevent accidental withdrawal of connecting pin 34. The locating pin 28 is similarly retained within its through bore 30, with the exception that instead of utilizing a short connecting pin 34, an end portion of a rod-like operating lever 37 is used as the transverse connector for said locating pin.

As illustrated in FIGS. 2, 3, 4, and 5, the operating lever 37 extends to the rear of the cabinets to be interlocked, and has welded or otherwise secured along a central portion thereof, an elongated interlocking clamp member 38. Clamp member 38 may be fabricated of bent sheet metal, and comprises a downwardly-extending portion 39, a horizontally extending or web portion 40, and an upwardly and inwardly extending portion 41 terminating in a comparatively short outwardly extending portion 42. The inner end of the operating lever 37 is bent downwardly, as indicated at 43, and may be fitted with a sleeve-like handle 44 to facilitate manual control of the interlocking device by an operator standing behind the cabinets to be interlocked or unlocked in the manner hereinafter described.

With reference to FIG. 2, it will be seen that the above described mechanism which retains locating pin 28 in coaxially constrained position within its through bore 30, permits limited rotation of said locating pin as controlled by up and down movement of the operating lever 37. This rotative movement is limited by the outer leg of the U-bracket 32 coming into abutting contact with the underside of the transverse web portion of inverted U-channel member 15. At such limit position, the interlocking clamp member 38 is sufficiently withdrawn from the outer face of the turned down skirt portion 13 of food service cabinet C1 as permits the turned skirt portion 14 of associated food service cabinet C2 to be placed in face to face position thereagainst. To insure such clearance, a front portion of upwardly and inwardly extending portion 41 and reversely bent portion 42 of the interlocking clamp member 38 can be cut away at an angle, as indicated at 45.

In use, whenever a pair of food service cabinets or the like equipped with the interlocking mechanism 10 embodying the invention are pushed together for interlocking engagement, the conically rounded end portions 27a, 28a of spaced locating pins 27, 28 will be guided within their respective through openings 25, 26. The cabinets will thus be brought into end to end registry, as illustrated in FIGS. 1, 4, and 5. The conical rounded end portions of the locating pins 27, 28 will, by cam action, bring the cabinets into proper vertical and horizontal alignment. After the cabinets are thus brought into alignment, the operating lever 37 will be moved upwardly from the unlocked position of FIG. 2 to the interlocking or clamping position illustrated in FIGS. 1, 4, and 5. In the upward movement of operating lever 37, its associated interlocking clamp member 38 will clampingly interengage the adjacent vertical legs of inverted U-channel members 15, 16 and their associated down turned skirt portions 13, 14, respectively, of the food service cabinets C1 and C2, to maintain the cabinets in interlocked condition. In this connection it is to be noted that the interlocking clamp member 38 preferably will be fabricated of spring steel or the like resilient material, to provide spring pressure constraining the thus interconnected cabinets in interlocked relation. The short, outwardly-extending portion 42 of the interlocking clamp member 38 serves to guide the adjacent legs of the inverted U-channel members 15 and 16 in place upon upward movement of said interlocking clamp member.

As illustrated in FIGS. 3 and 5, a spring clip 46 secured against the inside of the horizontal web portion of inverted U-channel member 15 as by screw 47, serves to yieldingly retain the operating lever 37 in uppermost or locking position. To this end, as best illustrated in FIG. 5, the spring clip 46 is formed with a reversely-bent outer end portion 48 adapted to abut an underside portion of the operating lever 37, thereby yieldingly urging it in locked position. Whenever it is desired to unlock the locking mechanism so that the interlocked cabinets C1 and C2 can be separated again, it is only necessary to push firmly down on the handle 44 of operating lever 37, whereupon the interlocking clamp member will be withdrawn again to permit separation by end to end withdrawal.

While I have illustrated and described herein only one form which my invention can conveniently be embodied in practice, it is to be understood that this embodiment is given by way of example only and not in a limiting sense. The invention, in brief, comprises all the embodiments and modifications coming within the scope and spirit of the following claims.

What I claim as new and desire to secure by Letters Patent is:

1. In an interlocking device for joining a pair of rectangular portable food service cabinets the upper surfaces of which are of sheet metal or the like having turned down marginal skirt portions, the improvement comprising, a first elongated support member secured in face-to-face relation against the inner surface of a transverse turned down skirt portion of one of the cabinets to be interlocked, a second elongated support member secured in face-to-face relation against the inner surface of a mating transverse turned down skirt portion of the other of the cabinets to be mutually interlocked, a pair of locating pins extending outwardly of said first elongated support member and its associated turned down marginal skirt portion, the outer ends of said locating pins being conically rounded, a pair of complemental through openings in said second elongated member and its associated turned down skirt portion for the reception of one each of the outwardly extending ends of said locating pins, an elongated interlocking clamp member of U-shaped cross-sectional configuration, and manually controlled means for moving said interlocking clamp member, selectively, into and out of straddling interclamping relation with respect to said first and second support members and said mating turned down skirt portions of said cabinet top after having been brought into face-to-face interfitting relation with said locating pins received within said complemental through openings.

2. An interlocking device as defined in claim 1 wherein said first and second elongated support members each comprises an inverted U-channel member one leg of each of which is disposed in face-to-face relation against the inner face of its respective turned down cabinet skirt portion, said interlocking clamp member having a resilient longitudinally-extending side portion operative to yieldingly abut the leg of one of said support members for constraining said cabinets in interlocked relation.

3. An interlocking device as defined in claim 2 wherein said manually controlled moving means for said interlocking clamp member comprises an elongated operating member along which said interlocking clamp member is affixed, means for pivotally securing one end of said operating lever with respect to an end portion of said first elongated support member, and a down handle at the other end of said operating lever for vertically swinging said operating lever in unison with said interlocking clamp member about said pivotally securing means.

4. An interlocking device as defined in claim 3 including spring clip means for yieldingly constraining said operating lever in the position whereat said interlocking clamp member is in said straddling interclamping relation.

5. An interlocking device as defined in claim 3 wherein said locating pins constraining means comprises a U-bracket straddling one each of said locating pins and joined thereto by respective transverse members fitted in aligned transverse openings in said pins and their respective U-bracket legs, said U-brackets being disposed between the legs of said first U-channel member, one end of said operating lever comprising said transverse member for one of said pins whereby said one of said pins serves as said pivotally supporting means for said operating lever.

6. An interlocking device as defined in claim 5 including spring clip means for yieldingly constraining said operating lever in the position whereat said interlocking clamp member is in said straddling interclamping relation.

7. An interlocking device as defined in claim 2 wherein said locating pins extend through respective pairs of transverse through openings in the legs of said first elongated support member, and means constraining said locating pins to limited axial and rotative movement within their respective pairs of transverse through openings.

8. An interlocking device as defined in claim 7 wherein said locating pins constraining means comprises a U-bracket straddling one each of said locating pins and joined thereto by respective transverse members fitted in aligned transverse openings in said pins and their respective U-bracket legs, said U-brackets being disposed between the legs of said first U-channel member.

\* \* \* \* \*